US012598629B2

(12) United States Patent
Zhang et al.

(10) Patent No.: US 12,598,629 B2
(45) Date of Patent: Apr. 7, 2026

(54) METHODS AND APPARATUSES FOR EXCHANGING CONFIGURATION INFORMATION REGARDING A MRB IN A MR-DC SCENARIO

(71) Applicant: Lenovo (Beijing) Limited, Beijing (CN)

(72) Inventors: Congchi Zhang, Shanghai (CN); Hyung-Nam Choi, Ottobrunn (DE); Mingzeng Dai, Shanghai (CN); Prateek Basu Mallick, Dreieich (DE); Lianhai Wu, Beijing (CN); Le Yan, Shanghai (CN); Joachim Löhr, Wiesbaden (DE)

(73) Assignee: Lenovo (Beijing) Limited, Beijing (CN)

( * ) Notice: Subject to any disclaimer, the term of this patent is extended or adjusted under 35 U.S.C. 154(b) by 406 days.

(21) Appl. No.: 18/268,760

(22) PCT Filed: Dec. 30, 2020

(86) PCT No.: PCT/CN2020/141394
§ 371 (c)(1),
(2) Date: Jun. 21, 2023

(87) PCT Pub. No.: WO2022/141194
PCT Pub. Date: Jul. 7, 2022

(65) Prior Publication Data
US 2024/0049256 A1 Feb. 8, 2024

(51) Int. Cl.
*H04H 20/71* (2008.01)
*H04L 5/00* (2006.01)
(Continued)

(52) U.S. Cl.
CPC ........... *H04W 72/30* (2023.01); *H04L 5/0035* (2013.01); *H04L 12/185* (2013.01)

(58) Field of Classification Search
CPC ..... H04W 72/30; H04W 72/27; H04W 76/11; H04W 76/40; H04W 76/15; H04W 76/27; H04L 5/0035; H04L 12/185
(Continued)

(56) References Cited

U.S. PATENT DOCUMENTS

| | | | |
|---|---|---|---|
| 2023/0013500 A1* | 1/2023 | Zong ..................... | H04W 76/12 |
| 2023/0180029 A1* | 6/2023 | Peng ..................... | H04W 24/02 |
| | | | 370/252 |

(Continued)

FOREIGN PATENT DOCUMENTS

| | | |
|---|---|---|
| EP | 3681202 A1 | 7/2020 |
| WO | 2020128848 A1 | 6/2020 |

OTHER PUBLICATIONS

CMCC , "Initial considerations of NR multicast", 3GPP TSG-RAN WG2 Meeting #111 electronic, R2-2007412, Online [retrieved Jun. 30, 2023]. Retrieved from the Internet <https://www.3gpp.org/ftp/tsg_ran/WG2_RL2/TSGR2_111-e/Docs>., Aug. 2020, 6 Pages.
(Continued)

*Primary Examiner* — Chuong T Ho
(74) *Attorney, Agent, or Firm* — FIG. 1 Patents

(57) ABSTRACT

Embodiments of the present application relate to methods and apparatuses for exchanging configuration information regarding a multicast radio bearer (MRB) in a multi-radio dual connectivity (MR-DC) scenario under a 3rd Generation Partnership Project (3GPP) 5G system or the like. According to an embodiment of the present application, a method can include: obtaining capability information regarding one or more neighbor nodes in a RAN, the capability information regarding the one or more neighbor nodes is associated with a multicast broadcast service (MBS); determining, based on the capability information regarding the one or more neighbor nodes, configuration information regarding a MRB; and transmitting, to a another RAN node in a MR-DC scenario,
(Continued)

the configuration information regarding the MRB, wherein the abovementioned another RAN node belongs to the one or more neighbor nodes.

20 Claims, 6 Drawing Sheets

(51) Int. Cl.
*H04W 72/30* (2023.01)
*H04L 12/18* (2006.01)

(58) Field of Classification Search
USPC .......................................................... 370/312
See application file for complete search history.

(56) References Cited

U.S. PATENT DOCUMENTS

| | | | |
|---|---|---|---|
| 2023/0189069 A1* | 6/2023 | Frankkila | H04W 28/065 |
| | | | 370/328 |
| 2023/0254666 A1* | 8/2023 | Qi | H04W 28/0268 |
| | | | 370/329 |
| 2023/0262734 A1* | 8/2023 | Qi | H04L 12/189 |
| | | | 455/414.1 |
| 2023/0262735 A1* | 8/2023 | Wu | H04L 1/1819 |
| | | | 370/312 |
| 2023/0276468 A1* | 8/2023 | Wu | H04W 72/30 |
| | | | 370/312 |
| 2023/0337066 A1* | 10/2023 | Wu | H04W 36/305 |
| 2023/0403537 A1* | 12/2023 | Chou | H04W 4/06 |
| 2024/0022358 A1* | 1/2024 | Wu | H04L 1/1861 |

OTHER PUBLICATIONS

PCT/CN2020/141394 , "International Preliminary Report on Patentability", PCT Application No. PCT/CN2020/141394, Jul. 13, 2023, 5 pages.
PCT/CN2020/141394 , "International Search Report and Written Opinion", PCT Application No. PCT/CN2020/141394, Sep. 28, 2023, 6 pages.
QUALCOMM Inc , "NR Multicast Radio Bearer Architecture aspects", 3GPP TSG-RAN WG2 Meeting #111e, R2-2006793, E-Meeting [retrieved Jun. 30, 2023]. Retrieved from the Internet <https://www.3gpp.org/ftp/TSG_RAN/WG2_RL2/TSGR2_111-e/Docs/>., Aug. 2020, 11 Pages.
RAN3 Chairman , "List of E-mail Discussions", 3GPP TSG-RAN WG3 #110-e, R3-206429, Online [retrieved Jun. 30, 2023]. Retrieved from the Internet <https://www.3gpp.org/ftp/TSG_RAN/WG3_lu/TSGR3_110-e/Docs/?sortby=daterev>., Nov. 2020, 33 Pages.
VIVO , "Overview of NR MBS", 3GPP TSG-RAN WG2 Meeting #111 electronic, R2-2007033, E-Meeting [retrieved Jun. 30, 2023]. Retrieved from the Internet <https://www.3gpp.org/ftp/TSG_RAN/WG2_RL2/TSGR2_111-e/Docs/>., Aug. 2020, 11 Pages.

* cited by examiner

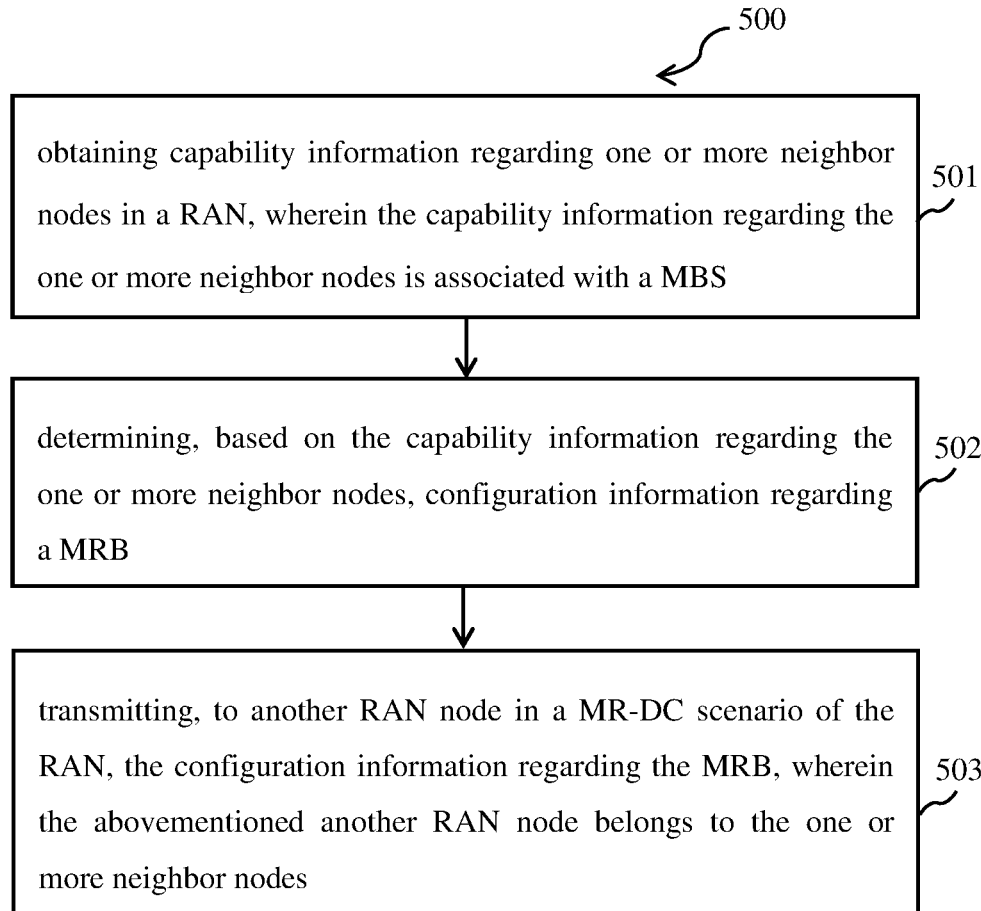

500 obtaining capability information regarding one or more neighbor nodes in a RAN, wherein the capability information regarding the one or more neighbor nodes is associated with a MBS   501 determining, based on the capability information regarding the one or more neighbor nodes, configuration information regarding a MRB   502 transmitting, to another RAN node in a MR-DC scenario of the RAN, the configuration information regarding the MRB, wherein the abovementioned another RAN node belongs to the one or more neighbor nodes   503

FIG. 5

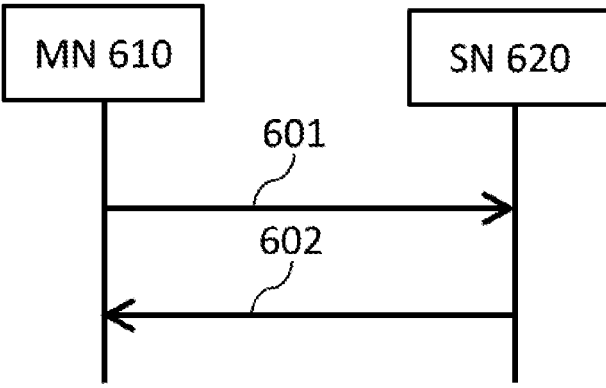

| | |
|---|---|
| receiving conditional configuration for a conditional PSCell addition and change (CPAC) procedure | 1201 |

| | |
|---|---|
| receiving capability information regarding each candidate cell of a UE or each SN of the UE, wherein the capability information is associated with a MBS | 1202 |

| | |
|---|---|
| starting the CPAC procedure | 1203 |

1400

1402

1404

Receiver

Transmitter

1408

Processor

1406

Medium

METHODS AND APPARATUSES FOR EXCHANGING CONFIGURATION INFORMATION REGARDING A MRB IN A MR-DC SCENARIO

TECHNICAL FIELD

Embodiments of the present application generally relate to wireless communication technology, especially to methods and apparatuses for exchanging configuration information regarding a multicast radio bearer (MRB) in a multiradio dual connectivity (MR-DC) scenario.

BACKGROUND

Next generation radio access network (NG-RAN) supports a MR-DC operation. In the MR-DC operation, a user equipment (UE) with multiple transceivers may be configured to utilize resources provided by two different nodes connected via non-ideal backhauls. Wherein one node may provide NR access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3GPP standard documents), and at least the MN is connected to the core network.

The 3rd Generation Partnership Project (3GPP) 5G system or network adopts a MRO mechanism. However, details of a mechanism for exchanging configuration information regarding a MRB in a MR-DC scenario have not been discussed in 3GPP 5G technology yet.

SUMMARY

Some embodiments of the present application provide a method for wireless communications. The method may be performed by performed by a radio access network (RAN) node, e.g., a MN or a SN. The method includes: obtaining capability information regarding one or more neighbor nodes in a RAN, the capability information regarding the one or more neighbor nodes is associated with a multicast broadcast service (MBS); determining, based on the capability information regarding the one or more neighbor nodes, configuration information regarding a multicast radio bearer (MRB); and transmitting, to a another RAN node in a multi-radio dual connectivity (MR-DC) scenario, the configuration information regarding the MRB, wherein the abovementioned another RAN node belongs to the one or more neighbor nodes.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a RAN node.

Some embodiments of the present application provide another method for wireless communications. The method may be performed by a UE. The method includes: receiving conditional configuration for a conditional PSCell addition and change (CPAC) procedure; receiving capability information regarding each candidate cell of the UE or each candidate SN of the UE, wherein the capability information is associated with a MBS; and starting the CPAC procedure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned another method performed by a UE.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 5 illustrates an exemplary flowchart of a method for transmitting MRB configuration information in accordance with some embodiments of the present application;

FIG. 6 illustrates an exemplary flowchart of exchanging MBS capability information between a MN and a SN in accordance with some embodiments of the present application;

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
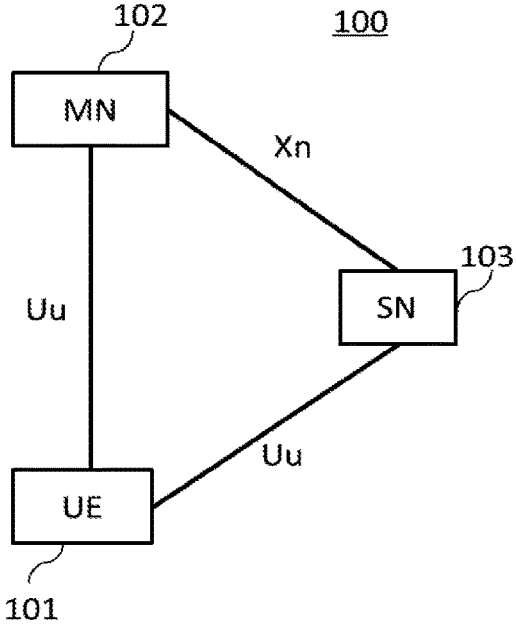
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB.

MN 102 may be associated with a master cell group (MCG). The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a secondary cell group (SCG). The SCG may refer to a group of serving cells associated with SN 103, and may include a primary secondary cell (PSCell) and optionally one or more secondary cells (SCells). The PCell of the MCG and the PSCell of the SCG may also be referred to as a special cell (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

As described above, in a MR-DC scenario, a UE is connected to a MN and a SN. To utilize resource(s) in the SN and improve the overall data rate and reliability, the MN can decide to offload a certain quality of service (QoS) flow to the SN or create a split radio bearer to support a QoS flow at the MN.

Figure 2:
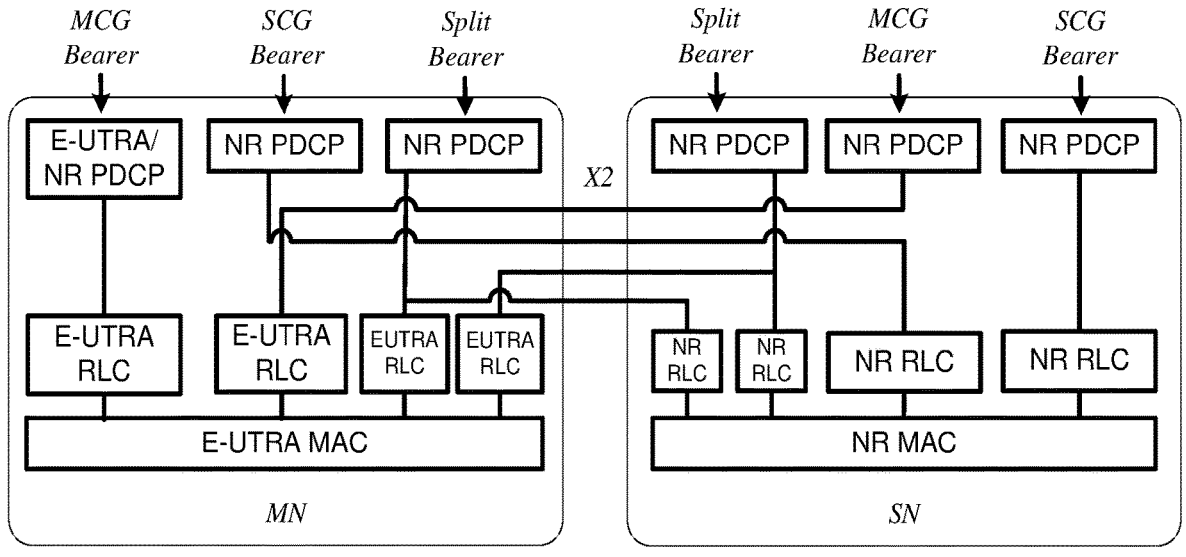
FIG. 2 illustrates a network side protocol termination options for MCG, SCG and split bearers in a MR-DC scenario with EPC (EN-DC) in accordance with 3GPP standard document TS37.340.

From a perspective of a network, each bearer (a MCG bearer, a SCG bearer, and a split bearer) can be terminated either in a MN or in a SN. As specified in 3GPP standard document TS37.340, network side protocol termination options are shown in FIG. 2 for a MR-DC with EPC (EN-DC) and in FIG. 3 for a MR-DC with 5GC (NGEN-DC, NE-DC and NR-DC). In general, a radio bearer configured with a service data adaptation protocol (SDAP) and a packet data convergence protocol (PDCP) entity located in the MN or the SN is considered as "a MN terminated radio bearer" or "a SN terminated radio bearer". A radio bearer configured with a radio link control (RLC) and a medium access control (MAC) entity located in MN or SN is considered as a MCG bearer or a SCG bearer. Thus, there are six types of radio bearers which can be configured in a MR-DC scenario: (1) a SN terminated MCG bearer; (2) a SN terminated SCG bearer; (3) a MN terminated MCG bearer; (4) a MN terminated SCG bearer; (5) a MN terminated split bearer; and (6) a SN terminated split bearer.

FIG. 2 illustrates a network side protocol termination options for MCG, SCG and split bearers in a MR-DC scenario with EPC (EN-DC) in accordance with 3GPP standard document TS37.340. As shown in FIG. 2, there are six types of radio bearers which can be configured in MR-DC scenario for a EPC case:

(1) MN terminated MCG bearer, with PDCP, RLC, and MAC located at MN.

(2) MN terminated SCG bearer, with PDCP located at MN while RLC and MAC located at SN.

(3) MN terminated split bearer, with PDCP located at MN while one RLC leg at MN and another RLC leg at SN.

(4) SN terminated split bearer, with PDCP located at SN while one RLC leg at MN and another RLC leg at SN.

(5) SN terminated MCG bearer, with PDCP located at SN while RLC and MAC located at MN.

(6) SN terminated SCG bearer, with PDCP, RLC, and MAC located at SN.

Figure 3:
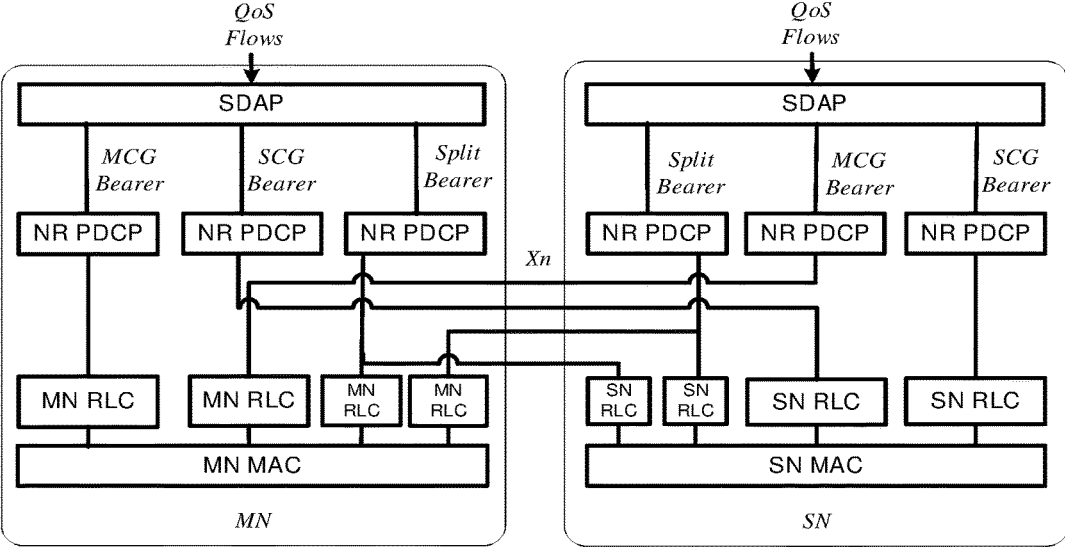
FIG. 3 illustrates a network side protocol termination options for MCG, SCG and split bearers in a MR-DC scenario with 5GC (NGEN-DC, NE-DC and NR-DC) in accordance with 3GPP standard document TS37.340.

FIG. 3 illustrates a network side protocol termination options for MCG, SCG and split bearers in a MR-DC scenario with 5GC (NGEN-DC, NE-DC and NR-DC) in accordance with 3GPP standard document TS37.340. As shown in FIG. 3, there are six types of radio bearers which can be configured in MR-DC scenario for a 5GC case:

(1) MN terminated MCG bearer, with SDAP and PDCP, RLC, and MAC located at MN.

(2) MN terminated SCG bearer, with SDAP and PDCP located at MN while RLC and MAC located at SN.

(3) MN terminated split bearer, with SDAP and PDCP located at MN while one RLC leg at MN and another RLC leg at SN.

(4) SN terminated split bearer, with (SDAP and) PDCP located at SN while one RLC leg at MN and another RLC leg at SN (5) SN terminated MCG bearer, with SDAP and PDCP located at SN while RLC and MAC located at MN.

(6) SN terminated SCG bearer, with SDAP and PDCP, RLC, and MAC located at SN.

Currently, according to 3GPP standard documents, agreements regarding bearer type selection and configuration in a MR-DC scenario are as follows.

In a MR-DC scenario for an EN-DC case, for each radio bearer, the MN decides the location of the PDCP entity and in which cell group(s) radio resources are to be configured. Once a SN terminated split bearer is established, e.g., by means of "Secondary Node Addition procedure" or "MN initiated Secondary Node Modification procedure", the SN may remove SCG resource(s) for the respective E-RAB, as long as the QoS for the respective E-RAB is guaranteed. In case a SN terminated bearer is released or reconfigured to a MN terminated bearer, only the MN generates the corresponding configuration and the SN does not generate the release configuration.

In a MR-DC scenario for a 5GC case, the following principles apply:

The MN decides per PDU session the location of the SDAP entity, i.e., whether it shall be hosted by the MN or the SN or by both (split PDU session).

If the MN decides to host an SDAP entity it may decide some of the related QoS flows to be realized as MCG bearer, some as SCG bearer, and others to be realized as split bearer.

If the MN decides that an SDAP entity shall be hosted in the SN, some of the related QoS flows may be realized as SCG bearer, some as MCG bearer, while others may be realized as split bearer. In this case, the SN decides how to realize the QoS flow, but if the MN does not offer MCG resources, the SN can only realize the QoS flow as SCG bearer. The SN may remove or add SCG resources for the respective QoS flows, as long as the QoS for the respective QoS flow is guaranteed.

If the MN decides that an SDAP entity shall be hosted in the SN, coordination of DRB IDs between the MN and the SN is needed to ensure unique allocation of DRBs for a UE. The SN is responsible to assign the DRB IDs for the DRBs it terminates, based on the DRB IDs indicated by the MN.

For each PDU session, including split PDU sessions, at most one default DRB may be configured. The MN decides whether the SN is allowed to setup the default DRB or not.

In case a SN terminated bearer is released or reconfigured to a MN terminated bearer, the MN generates the corresponding configuration and the SN does not generate the release configuration. The only exceptional case in which the SN generates the release configuration is for the DRB release due to a QoS flow to DRB remapping within SN.

According to 3GPP standard documents, agreements regarding MBS traffic delivery methods are as follows. MBS traffic needs to be delivered from a single data source (application service provider) to multiple UEs. Depending on many factors, multiple delivery methods may be used to deliver MBS traffic in the 5GS.

From the point of view of a 5G core network (CN), following two delivery methods are possible for a MBS multicast service:

(1) 5GC individual MBS traffic delivery method: a 5G CN receives a single copy of MBS data packets and delivers separate copies of those MBS data packets to individual UEs via per-UE PDU sessions, hence for each such UE one PDU session is required to be associated with a multicast session.

(2) 5GC shared MBS traffic delivery method: a 5G CN receives a single copy of MBS data packets and delivers a single copy of those MBS packets packet to a RAN node, which then delivers them to one or multiple UEs.

If 5GC individual MBS traffic delivery method is supported, a same received single copy of MBS data packets by the 5G CN may be delivered via both "5GC individual MBS traffic delivery method" for some UE(s) and "5GC shared MBS traffic delivery method" for some other UE(s).

From the viewpoint of a RAN, in the 5GC shared MBS traffic delivery case, following two delivery methods are available for the transmission of MBS packet flows over radio:

(1) Point-to-Point (PTP) delivery method: a RAN node delivers separate copies of MBS data packet over radio to individual UE.

(2) "Point-to-Multipoint (PTM) delivery method: a RAN node delivers a single copy of MBS data packets over radio to a set of UEs.

A RAN node may use a combination of "PTP delivery method" and "PTM delivery method" to deliver an MBS packet to UE(s).

For a MBS broadcast service, only 5GC shared MBS traffic delivery method with PTM delivery is applicable. From a RAN's point of view, 3GPP RAN2 working group specifies two modes for NR MBS delivery: (1) one delivery mode for high QoS (reliability, latency) requirement, to be available in RRC CONNECTED state (possibly the UE can switch to other states when there is no data reception); and (2) one delivery mode for "low" QoS requirement, wherein the UE can also receive data in RRC INACTIVE or IDLE state.

Figure 4:
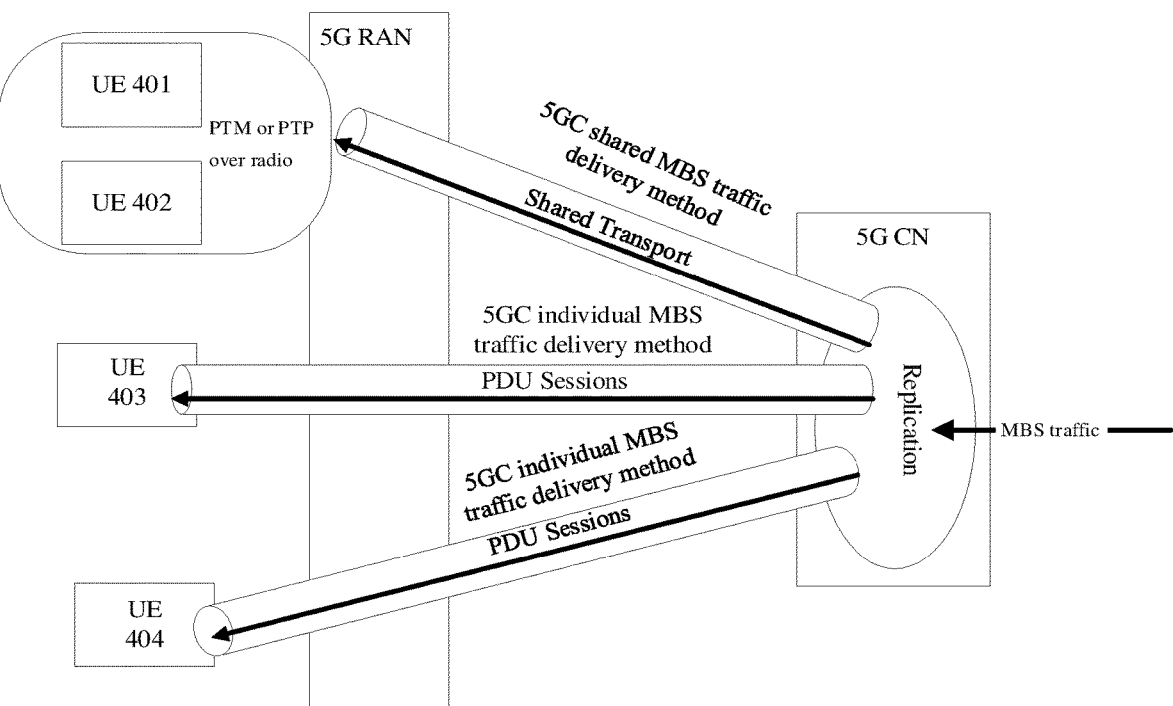
FIG. 4 illustrates exemplary delivery methods for transmitting multicast broadcast service (MBS) packet flows in accordance with some embodiments of the present application.

FIG. 4 illustrates exemplary delivery methods for transmitting multicast broadcast service (MBS) packet flows in accordance with some embodiments of the present application.

In the embodiments of FIG. 4, "5GC shared MBS traffic delivery method" (with "PTP delivery method" or "PTM delivery method") and "5GC individual MBS traffic delivery method" may be used at the same time for a multicast MBS session. In particular, as shown in FIG. 4, replications of MBS traffic are transmitted from 5G CN, via 5G RAN, to UE 401, UE 402, UE 403, and UE 404, respectively. For example, replications of MBS traffic are transmitted to UE 401 and UE 402 through "5GC shared MBS traffic delivery method", which uses "Shared Transport", replications of MBS traffic are transmitted to UE 403 through "5GC individual MBS traffic delivery method", which uses "PDU sessions", and replications of MBS traffic are transmitted to UE 404 through "5GC individual MBS traffic delivery method", which uses "PDU sessions".

According to agreements of 3GPP standard documents, a conditional PSCell addition and change (CPAC) procedure is defined as a PSCell addition or change that is executed by a UE when execution condition(s) is met. A UE starts evaluating the execution condition(s) upon receiving the CPAC configuration, and stops evaluating the execution condition(s) once PSCell addition or change is triggered. The following principles apply to a CPAC procedure:

The CPAC configuration contains the configuration information of CPAC candidate cell(s) and execution condition(s) generated by the MN or the SN.

An execution condition may consist of one or two trigger condition(s) (CPC event A3 or CPC event A5). Only single reference signal (RS) type is supported and at most two different trigger quantities (e.g., RSRP and RSRQ, RSRP and SINR, etc.) can be configured simultaneously for the evaluation of CPAC execution condition of a single candidate PSCell.

Before any CPAC execution condition is satisfied, upon reception of PSCell addition command or PSCell change command or PCell change command, the UE executes the PSCell change procedure or the PCell change procedure, regardless of any previously received CPAC configuration. Upon the successful completion of PSCell change procedure or PCell change procedure, the UE releases all stored CPAC configurations.

While executing the CPAC procedure, the UE is not required to continue evaluating the execution condition of other candidate PSCell(s).

Once the CPAC procedure is executed successfully, the UE releases all stored CPAC configurations.

Upon the release of SCG, the UE releases the stored CPAC configurations.

In 3GPP Release 17, a 5G based MBS is going to be supported. Since supporting 5G MBS service is regarded as a new feature for a RAN node, both a 5G MBS supportive RAN node and a 5G MBS non-supportive RAN node will coexist. Besides, some MBS service(s) is considered as local service(s). For a Vehicle to everything (V2X) scenario, a public safety scenario, and other service scenario(s) provided locally, a multicast communication service or a broadcast communication service may be only available in a local service area (e.g., per a cell, a tracking area (TA), or other geographic metric) and for a specific time (e.g., during event hours, an emergency situation, or operation hours). Therefore, in a MR-DC scenario, whether and/or how a MN can involve a SN to transmit MBS service data in the downlink should considers the following aspects: if a SN node is MBS-supportive; if a SN is within the service area for local MBS services; if a SN supports PTM transmission with HARQ feedback; and if UE(s) in the same multicast group are connected to the same SN.

Some embodiments of the present application provide a mechanism for exchanging configuration information regarding a MRB in a MR-DC scenario in 3GPP 5G system or the like. Some embodiments of the present application provide a mechanism for transmitting configuration information regarding a MRB in a MR-DC scenario in 3GPP 5G system or the like. Some embodiments of the present application provide a mechanism for receiving configuration information regarding a MRB in a MR-DC scenario in 3GPP 5G system or the like. More details will be illustrated in the following text in combination with the appended drawings.

Figure 7:
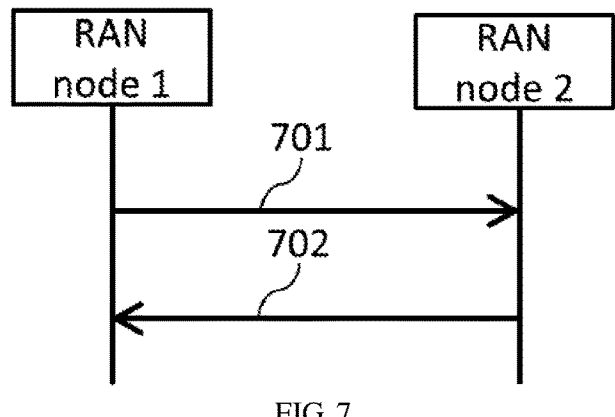
FIG. 7 illustrates an exemplary flowchart of exchanging MBS capability information between two RAN nodes in accordance with some embodiments of the present application.
Figure 8:
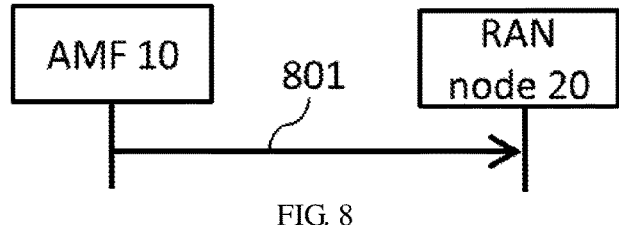
FIG. 8 illustrates an exemplary flowchart of receiving MBS capability information from an access and mobility management function (AMF) in accordance with some embodiments of the present application.

FIG. 5 illustrates an exemplary flowchart of a method for transmitting MRB configuration information in accordance with some embodiments of the present application. The exemplary method 500 in the embodiments of FIG. 5 may be performed by a RAN node, for example:

RAN node 1, RAN node 2, or RAN node 20 as illustrated and shown in FIG. 7 or FIG. 8);

a MN (e.g., MN 102, MN 610, MN 910, MN 1010, or MN 1110 as illustrated and shown in any of FIGS. 1, 6, and 9-11); or a SN (e.g., SN 103, SN 620, SN 920, SN 1020, or SN 1120 as illustrated and shown in any of FIGS. 1, 6, and 9-11).

Although described with respect to a RAN node, it should be understood that other devices may be configured to perform a method similar to that of FIG. 5. The embodiments of FIG. 5 assume that a MN and a SN may be combined in any one of EN-DC, NGEN-DC, NE-DC, and NR-DC scenarios. Following definitions are assumed in the embodiments of FIG. 5:

Fast MCG link recovery: in a MR-DC scenario, an RRC procedure where the UE sends an MCG Failure Information message to the MN via the SCG upon the detection of a radio link failure on the MCG.

Master Cell Group: in a MR-DC scenario, a group of serving cells associated with the Master Node, comprising of the SpCell (PCell) and optionally one or more SCells.

Secondary Cell Group: in a MR-DC scenario, a group of serving cells associated with the Secondary Node, comprising of the SpCell (PSCell) and optionally one or more SCells.

Secondary node: in a MR-DC scenario, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC).

SCG bearer: in a MR-DC scenario, a radio bearer with an RLC bearer (or two RLC bearers, in case of CA packet duplication in an E-UTRAN cell group, or up to four RLC bearers in case of CA packet duplication in a NR cell group) only in the SCG.

SpCell: a primary cell of a master or secondary cell group.

signaling radio bearer (SRB) 3: in EN-DC, NGEN-DC and NR-DC, a direct SRB between the SN and the UE.

Split bearer: in a MR-DC scenario, a radio bearer with RLC bearers both in MCG and SCG.

In the exemplary method 500 as shown in FIG. 5, in operation 501, a RAN node obtains capability information regarding one or more neighbor nodes in a RAN. The capability information regarding one or more neighbor nodes is associated with a MBS. The capability information associated with a MBS may also be named as MBS capability information or the like. The one or more neighbor nodes are around the RAN node in the RAN.

According to some embodiments of the present application, the RAN node is a MN in the MR-DC scenario, and the abovementioned another RAN node is a SN in the MR-DC scenario. According to some other embodiments of the present application, the RAN node is a SN in the MR-DC scenario, and the abovementioned another RAN node is a MN in the MR-DC scenario.

According to some embodiments, the MBS capability information obtained in operation 501 may be obtained over one of: a Xn interface message; a X2 interface message; and a N2 interface message.

In some embodiments, the MBS capability information regarding the one or more neighbor nodes is obtained over a Xn interface message, e.g., during a Xn setup procedure, during a SN addition procedure, or during a NG-RAN node configuration update procedure. Specific examples are described in FIGS. 6 and 7.

In further embodiments, the MBS capability information regarding the one or more neighbor nodes is obtained over a X2 interface message, e.g., during a X2 setup procedure, during a secondary gNB (SgNB) addition procedure, or during an X2 eNB configuration update procedure. Specific examples are described in FIGS. 6 and 7.

In some additional embodiments, the MBS capability information regarding the one or more neighbor nodes is obtained over N2 interface message, e.g., from an AMF in a CN or other entity in the CN. According to some embodiments, an AMF in a CN or other entity in the CN may provide MBS capability information to a RAN node via N2 interface. A specific example is shown in FIG. 8. According to some other embodiments, an AMF in a CN or other entity in the CN may retrieve MBS capability information from each RAN node via N2 interface.

In some embodiments, the MBS capability information obtained in operation 501 indicates at least one of following information or a combination thereof:

(1) Whether a neighbor node within the one or more neighbor nodes supports a service belonging to the MBS. The service belonging to the MBS is a multicast service or a broadcast service.

(2) What service belonging to the MBS is supported by the neighbor node, if the neighbor node supports a service belonging to the MBS.

(3) Whether the neighbor node supports a PTM transmission.

(4) Whether the neighbor node supports a hybrid automatic repeat request (HARQ) feedback operation, if the neighbor node supports the PTM transmission.

(5) Whether the neighbor node supports a multicast session in a radio resource control (RRC) connected state.

(6) Whether the neighbor node supports a broadcast session in a RRC connected state.

A MBS delivery in a RRC connected state (either a multicast session or a broadcast session) is marked as "mode 1" in some cases, which refers to one delivery mode for "high" QoS (reliability, latency) requirement, to be available in a RRC connected state. Possibly, a UE can switch to other states when there is no data reception. A RRC connected state may also be named as a RRC CONNECTED state or the like.

(7) Whether the neighbor node supports a multicast session in at least one of a RRC inactive state and a RRC idle state.

(8) Whether the neighbor node supports a broadcast session in at least one of a RRC inactive state and a RRC idle state.

A MBS delivery in a RRC inactive state and/or a RRC idle state (either a multicast session or a broadcast session) is marked as "mode 2" in some cases, which refers to one delivery mode for "low" QoS requirement and in which UE can also receive data in a RRC inactive state or a RRC idle state. A RRC inactive state may also be named as a RRC INACTIVE state or the like. A RRC idle state may also be named as a RRC IDLE state or the like.

(9) Whether the neighbor node supports a multicast session associated with the MBS.

(10) Whether the neighbor node supports a broadcast session associated with the MBS.

Figures 11, 12:
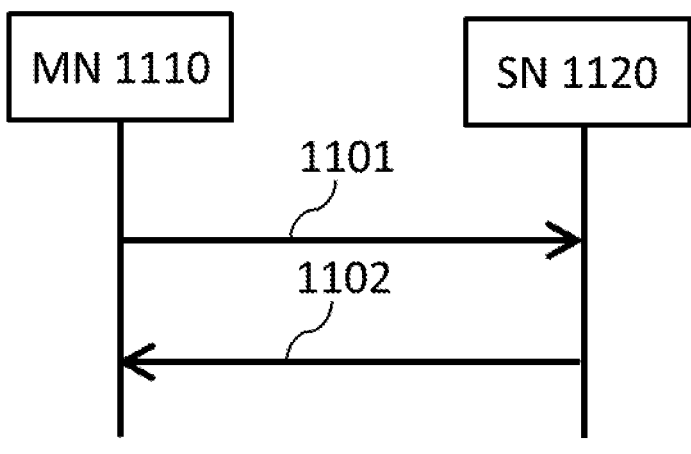
FIG. 11 illustrates an exemplary flowchart of transmitting MRB configuration information during a SN addition procedure in accordance with some embodiments of the present application.
FIG. 12 illustrates an exemplary flowchart of a method for receiving capability information associated with a MBS in accordance with some embodiments of the present application.
Figures 13, 14:
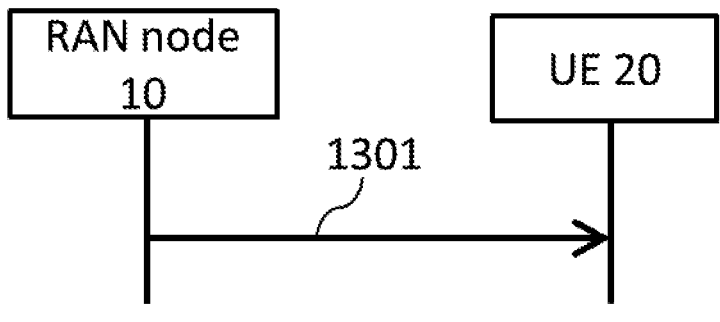
FIG. 13 illustrates an exemplary flowchart of MRB configuration transmission in a conditional PSCell addition and change (CPAC) procedure in accordance with some embodiments of the present application.
FIG. 14 illustrates an exemplary block diagram of an apparatus according to some embodiments of the present application.

According to some embodiments, the RAN node selects, from the MBS capability information regarding the one or more neighbor nodes, capability information regarding each candidate cell of a UE or each candidate SN of the UE. Then, the RAN node transmits, to the UE, the capability information regarding each candidate cell of the UE or each candidate SN of the UE. In one embodiment, the capability information regarding each candidate cell or each candidate SN is transmitted in a RRC message, and the RRC message includes conditional configuration information for a conditional PSCell addition and change (CPAC) procedure. A specific example is shown in FIGS. 12 and 13.

Referring back to FIG. 5, in operation 502, the RAN node determines, based on the MBS capability information regarding the one or more neighbor nodes, configuration information regarding a MRB. In operation 503, the RAN node transmits, to another RAN node in a MR-DC scenario of the RAN, the configuration information regarding the MRB. The abovementioned another RAN node belongs to the one or more neighbor nodes, and may be named as a counterpart node of the RAN node, a counterpart RAN node, or the like. The configuration information regarding the MRB may be named as MRB configuration information or the like.

According to some embodiments, the MRB uses one or more resources of the abovementioned another RAN node, and the MRB may be at least one of: a MN terminated SCG bearer, a MN terminated split bearer, a SN terminated MCG bearer, and a SN terminated split bearer.

According to some embodiments, if the abovementioned another RAN node supports a PTM transmission, the MRB configuration information transmitted by the RAN node in operation 503 includes configuration information regarding a PTM MRB.

According to some embodiments, the MRB configuration information transmitted in operation 503 is included in one of following message:

(1) A X2 interface message.

(2) A container in a radio resource control (RRC) message, e.g., inter-node RRC message.

(3) A Xn interface message. For example, the Xn interface message may be at least one of: a SN addition request message; a SN addition request acknowledge message;

a SN modification request message; a SN modification request acknowledge message; a SN modification required message; and a SN modification confirm message.

According to some embodiments, the MRB configuration information transmitted in operation 503 is included in an information element (IE) within the Xn interface message. For instance, the IE within the Xn interface message may be at least one of:

a SN terminated packet data unit (PDU) session resource setup information IE, e.g., "PDU Session Resource Setup Info—SN terminated";

a SN terminated PDU session resource setup response information IE, e.g., "PDU Session Resource Setup Response Info—SN terminated";

a MN terminated PDU session resource setup information IE, e.g., "PDU Session Resource Setup Info—MN terminated";

a MN terminated PDU session resource setup response information IE, e.g., "PDU Session Resource Setup Response Info—MN terminated";

a SN terminated PDU session resource modification information IE, e.g., "PDU Session Resource Modification Info—SN terminated";

a SN terminated PDU session resource modification response information IE, e.g., "PDU Session Resource Modification Response Info—SN terminated";

a MN terminated PDU session resource modification information IE, e.g., "PDU Session Resource Modification Info—MN terminated";

a MN terminated PDU session resource modification response information IE, e.g., "PDU Session Resource Modification Response Info—MN terminated";

a MBS session resource setup information IE, e.g., "MBS Session Resource Setup Info"; and a pre-configured IE within the Xn interface message. For example, the MRB configuration information may be conveyed in a newly defined IE within the Xn message.

According to some embodiments, the MRB configuration information transmitted in operation 503 includes at least one of following contents:

(1) An indicator regarding a service. The indicator regarding a service may be one of: an indicator implying that the service belongs to the MBS (i.e., a MBS service); an indicator implying that the service does not belong to the MBS (i.e., non-MBS service); and a temporary mobile group identity (TMGI).

(2) A bearer type. The bearer type may include one of: a PTP MRB; a PTM MRB; and a bearer including a PTP RLC leg and a PTM RLC leg.

(3) PDCP layer configuration information.

(4) RLC layer configuration information.

(5) Configuration information regarding a HARQ feedback operation for a PTM MRB. The configuration information regarding the HARQ feedback operation for the PTM MRB includes one of: acknowledgement (ACK) feedback information and negative acknowledgement (NACK) feedback information; and only NACK feedback information.

According to some embodiments, the RAN node receives, from the abovementioned another RAN node, additional MRB configuration information. In different embodiments, the additional MRB configuration information may be received before or after the MRB configuration information transmitted by the RAN node in operation 503. Compared with the MRB configuration information transmitted by the RAN node in operation 503, the additional MRB configuration information received by the RAN node may be in the same or similar format or include the same or similar contents as described above. Specific examples are shown in FIGS. 6, 7, and 9-11.

According to some embodiments, the RAN node transmits, to the abovementioned another RAN node, information regarding a group of associated UEs. Each UE within the group of associated UEs receives one service belonging to the MBS. For instance, each of the information regarding the group of associated UEs includes at least one of: a list of UE identifiers (IDs) of this group of associated UEs; and an ID of the one service belonging to the MBS. In an embodiment, the information regarding the group of associated UEs and the MRB configuration information are included in two information elements (IEs) within one message.

Figure 9:
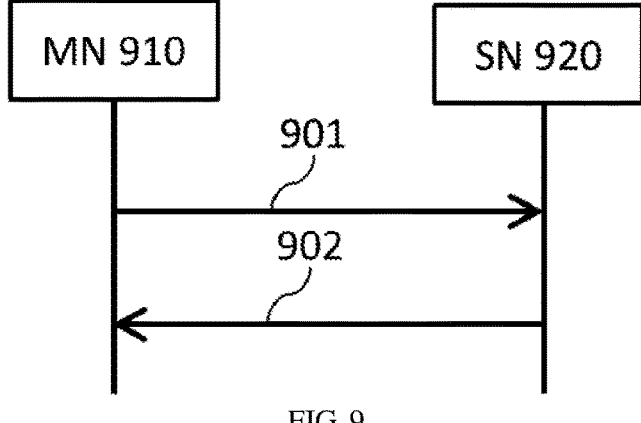
FIG. 9 illustrates an exemplary flowchart of transmitting MRB configuration information during a MN initiated SN modification procedure in accordance with some embodiments of the present application.
Figure 10:
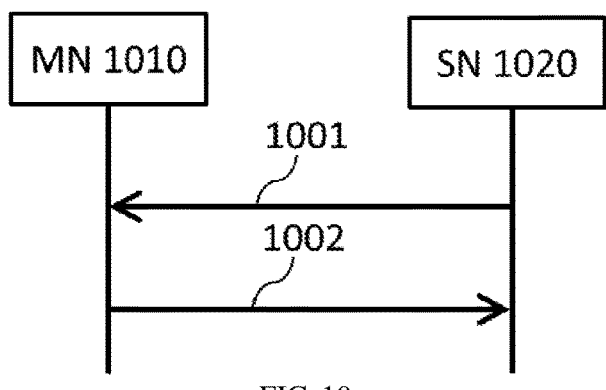
FIG. 10 illustrates an exemplary flowchart of transmitting MRB configuration information during a SN initiated SN modification procedure in accordance with some embodiments of the present application.

In some embodiments, the RAN node also receives, from the abovementioned another RAN node, further information regarding a further group of associated UEs, and each UE within the further group of associated UEs receives one service belonging to the MBS. For instance, each of the further information regarding the further group of associated UEs includes at least one of: a list of UE IDs of this further group of associated UEs; and an ID of the same one service belonging to the MBS. Specific examples are shown in FIGS. 9-11.

In an example, if the RAN node receives the further information regarding the further group of associated UEs, the RAN node identifies each UE within the further group of associated UEs, generates a RRC reconfiguration message for each UE within the further group of associated UEs, and transmits the RRC reconfiguration message to each UE within the further group of associated UEs.

In a further example, if the RAN node receives the further information regarding the further group of associated UEs, the RAN node determines whether a PTM MRB is configured to the first RAN node and whether a HARQ feedback operation is enabled for the first RAN node. If the PTM MRB is configured to the RAN node and the HARQ feedback operation is enabled for the RAN node, the RAN node may configure one or more PUCCH resources to the further group of associated UEs.

According to some embodiments, if the RAN node receives the further MRB configuration information and if the RAN node accepts to establish a PTM MRB based on the received further MRB configuration information, the RAN node generates a group radio network temporary identifier (G-RNTI) and transmits the G-RNTI to a UE. The G-RNTI may be transmitted in a radio resource control (RRC) message.

According to some other embodiments, if the RAN node receives the further MRB configuration information and if the RAN node rejects to establish a PTM MRB based on the received further MRB configuration information, the RAN node transmits a rejection cause. The rejection cause may be transmitted in one of: a SN addition request reject message, a SN modification request reject message, and a SN modification refuse message.

In particular, in some embodiments, when a group of UEs are receiving the same MBS service from a network and connected to the same MN and SN (i.e., under the same MRDC scenario), MRB configuration provision between nodes can be handled in a group manner to save signaling overhead. As such, the same MRB configuration information is applied to all UEs receiving the same MBS service. For example, there is a group of UEs connected to the same MN and SN receiving the same broadcast service, the MN may decide to turn a MRB of a MN terminated MCG bearer into a MN terminated SCG bearer, while the new MRB configuration information is applied to all UEs in the group of UEs. The group of UEs may be named as a group of affected UEs, a group of associated UEs, or the like.

In an embodiment, when a MN provides MRB configuration information to a SN for, e.g., a MN terminated SCG bearer or a MN terminated split bearer, or when a SN provides MRB configuration information to a MN for, e.g., a SN terminated MCG bearer or a SN terminated split bearer, the MN or the SN also indicates a list of associated UEs that are receiving the same MBS service in the same Xn message or in inter-node RRC message. The Xn message or the inter-node RRC message can be an existing UE associated message, e.g., a SN ADDITION REQUEST message, or a SN ADDITION REQUEST ACKNOWLEDGE message, and etc. The Xn message or the inter-node RRC message can also be a newly defined non-UE associated message.

In a further embodiment, the list of affected UEs can be indicated by a list of UE ID (e.g., NG-RAN node UE XnAP ID), or an MBS service ID (e.g., TMGI). If an MBS service ID is provided, the MN or the SN can identify the affected UEs from UE context about their subscribed or interested MBS services.

In an additional embodiment, after receiving the Xn message or the RRC message which includes the MRB configuration and identifying the affected UEs, the MN or the SN can generate a RRC Reconfiguration message for each individual UE and sends to each UE via RRC signalling respectively.

In another embodiment, in case a PTM MRB is configured to a SN with HARQ feedback (ACK&NACK or NACK only) being enabled in the SN, the SN can provide the corresponding PUCCH resources to the list of UEs that need to send HARQ feedback in the SCG uplink (UL). In case a PTM MRB is configured to a MN with HARQ feedback (ACK&NACK or NACK only) being enabled in the MN, the MN can provide the corresponding PUCCH resources to the list of UEs that need to send HARQ feedback in the MCG UL.

Details described in all other embodiments of the present application (for example, details of transmitting MRB configuration information) are applicable for the embodiments of FIG. 5. Moreover, details described in the embodiments of FIG. 5 are applicable for all the embodiments of FIGS. 1-4 and 6-14.

FIG. 6 illustrates an exemplary flowchart of exchanging MBS capability information between a MN and a SN in accordance with some embodiments of the present application.

According to some embodiments of FIG. 6, a MN and a SN exchange MBS capability information during a SN addition procedure via an Xn interface. As shown in FIG. 6, in operation 601, MN 610 (e.g., MN 102 as illustrated and shown in FIG. 1) may transmit an S-NODE ADDITION REQUEST message to SN 620 (e.g., SN 103 as illustrated and shown in FIG. 1) via an Xn interface. The S-NODE ADDITION REQUEST message includes MBS capability information regarding MN 610. In operation 602, SN 620 may transmit an S-NODE ADDITION REQUEST ACKNOWLEDGE message to MN 610 via the Xn interface. The S-NODE ADDITION REQUEST ACKNOWLEDGE message includes MBS capability information regarding SN 620. In other words, through the embodiments of FIG. 6, MN 610 and SN 620 exchange their MBS capability information during a SN addition procedure.

According to some other embodiments of FIG. 6, a MN and a SN exchange MBS capability information during a SgNB addition procedure via an X2 interface. As shown in FIG. 6, in operation 601, MN 610 (e.g., MN 102 as illustrated and shown in FIG. 1) may transmit an SGNB ADDITION REQUEST message to SN 620 (e.g., SN 103 as illustrated and shown in FIG. 1) via an X2 interface. The SGNB ADDITION REQUEST message includes MBS capability information regarding MN 610. In operation 602, SN 620 may transmit an SGNB ADDITION REQUEST ACKNOWLEDGE message to MN 610 via the X2 interface. The SGNB ADDITION REQUEST ACKNOWLEDGE message includes MBS capability information regarding SN 620. In other words, through the embodiments of FIG. 6, MN 610 and SN 620 exchange their MBS capability information during a SGNB addition procedure.

Details described in all other embodiments of the present application (for example, details of a mechanism for exchanging MBS capability information) are applicable for the embodiments of FIG. 6. Moreover, details described in the embodiments of FIG. 6 are applicable for all the embodiments of FIGS. 1-5 and 7-14.

FIG. 7 illustrates an exemplary flowchart of exchanging MBS capability information between two RAN nodes in accordance with some embodiments of the present application.

According to some embodiments of FIG. 7, during an Xn setup procedure, RAN node 1 (e.g., MN 102 as illustrated and shown in FIG. 1) and RAN node 2 (e.g., SN 103 as illustrated and shown in FIG. 1) may exchange their MBS capability information. As shown in FIG. 7, in operation 701, RAN node 1 transmits XN SETUP REQUEST message to RAN node 2. The XN SETUP REQUEST message includes MBS capability information regarding RAN node 1. In operation 702, RAN node 2 transmits XN SETUP RESPONSE message to RAN node 1. The XN SETUP RESPONSE message includes MBS capability information regarding RAN node 2.

According to some other embodiments of FIG. 7, during a NG-RAN node configuration update procedure, RAN node 1 (e.g., SN 103 as illustrated and shown in FIG. 1) and RAN node 2 (e.g., MN 102 as illustrated and shown in FIG. 1) may exchange their MBS capability information. As shown in FIG. 7, in operation 701, RAN node 1 transmits NG-RAN NODE CONFIGURATION UPDATE message to RAN node 2. The NG-RAN NODE CONFIGURATION UPDATE message includes MBS capability information regarding RAN node 1. In operation 702, RAN node 2 transmits NG-RAN NODE CONFIGURATION UPDATE ACKNOWLEDGE message to RAN node 1. The NG-RAN NODE CONFIGURATION UPDATE ACKNOWLEDGE message includes MBS capability information regarding RAN node 2.

According to some additional embodiments of FIG. 7, during an X2 setup procedure, RAN node 1 (e.g., SN 103 as illustrated and shown in FIG. 1) and RAN node 2 (e.g., MN 102 as illustrated and shown in FIG. 1) may exchange their MBS capability information. As shown in FIG. 7, in operation 701, RAN node 1 transmits X2 SETUP REQUEST message to RAN node 2. The X2 SETUP REQUEST message includes MBS capability information regarding RAN node 1. In operation 702, RAN node 2 transmits X2 SETUP RESPONSE message to RAN node 1. The X2 SETUP RESPONSE message includes MBS capability information regarding RAN node 2.

According to yet some additional embodiments of FIG. 7, during an X2 eNB configuration update procedure, RAN node 1 (e.g., SN 103 as illustrated and shown in FIG. 1) and RAN node 2 (e.g., MN 102 as illustrated and shown in FIG. 1) may exchange their MBS capability information. As shown in FIG. 7, in operation 701, RAN node 1 transmits ENB CONFIGURATION UPDATE message to RAN node 2. The ENB CONFIGURATION UPDATE message includes MBS capability information regarding RAN node 1. In operation 702, RAN node 2 transmits ENB CONFIGU- RATION UPDATE ACKNOWLEDGE message to RAN node 1. The ENB CONFIGURATION UPDATE ACKNOWLEDGE message includes MBS capability infor- mation regarding RAN node 2.

Details described in all other embodiments of the present application (for example, details of a mechanism for exchanging MBS capability information) are applicable for the embodiments of FIG. 7. Moreover, details described in the embodiments of FIG. 7 are applicable for all the embodi- ments of FIGS. 1-6 and 8-14.

FIG. 8 illustrates an exemplary flowchart of receiving MBS capability information from an access and mobility management function (AMF) in accordance with some embodiments of the present application.

In the embodiments of FIG. 8, MBS capability informa- tion of neighbor RAN node(s) may be provided by an AMF in a CN to a RAN node via a N2 interface. In some other embodiments, MBS capability information of neighbor RAN node(s) may be provided by other entity in the CN to a RAN node.

As shown in FIG. 8, in operation 801, AMF 10 transmits, via a N2 interface, MBS capability information of neighbor RAN node(s) to RAN node 20 (e.g., any one of MN 102, SN 103, MN 610, SN 620, RAN node 1, RAN node 2, MN 910, SN 920, MN 1010, SN 1020, MN 1110, MN 1120 and RAN node 10 as illustrated and shown in any of FIGS. 1, 6-11, and 13). For example, if RAN node 20 has three neighbor RAN nodes in the CN, AMF 10 may transmit MBS capability information of these three neighbor RAN nodes to RAN node 20 via a N2 interface.

Details described in all other embodiments of the present application (for example, details of a mechanism for receiv- ing MBS capability information) are applicable for the embodiments of FIG. 8. Moreover, details described in the embodiments of FIG. 8 are applicable for all the embodi- ments of FIGS. 1-7 and 9-14.

FIG. 9 illustrates an exemplary flowchart of transmitting MRB configuration information during a MN initiated SN modification procedure in accordance with some embodi- ments of the present application.

As shown in FIG. 9, in operation 901, to configure a MN terminated SCG bearer or a MN terminated split bearer or to offload a QoS flow to a SN terminated bearer, MN 910 (e.g., MN 102 as illustrated and shown in FIG. 1) transmits a S-NODE MODIFICATION REQUEST message to SN 920 (e.g., SN 103 as illustrated and shown in FIG. 1). The S-NODE MODIFICATION REQUEST message includes MRB configuration information which should be used at SN 920. The MRB configuration information in the S-NODE MODIFICATION REQUEST message may contain at least one of:

(1) Parameter(s) of RLC and MAC layers for a MN terminated SCG bearer, and these parameter(s) are suggested by MN 910 to be adopted by SN 920.

(2) Parameter(s) of RLC and MAC layers for a MN terminated split bearer, and these parameter(s) are suggested by MN 910 to be adopted by SN 920.

(3) Parameter(s) of SDAP, PDCP, RLC and MAC layers for a SN terminated radio bearer, and these parameter (s) are suggested by MN 910 to be adopted by SN 920.

Optionally, in addition to the MRB configuration infor- mation, the S-NODE MODIFICATION REQUEST message may include a list of affected UEs. Each UE within the list of affected UEs receives one service belonging to the MBS. The list of affected UEs can be indicated by a list of UE ID (e.g., NG-RAN node UE XnAP ID), or an MBS service ID (e.g., TMGI). If an MBS service ID is provided, SN 920 can identify the affected UEs from UE context about their subscribed or interested MBS services.

If SN 920 accepts the SN modification request from MN 910, SN 920 may reply a S-NODE MODIFICATION REQUEST ACKNOWLEDGE message in operation 902. The S-NODE MODIFICATION REQUEST ACKNOWL- EDGE message include MRB configuration information, if SN 920 decides to configure a SN terminated MCG bearer or a SN terminated split bearer using resource(s) from MN 910. The MRB configuration information in the S-NODE MODIFICATION REQUEST ACKNOWLEDGE message may contain: parameter(s) of RLC and MAC layers for a SN terminated MCG bearer or SN terminated split bearer that are suggested by SN 920 to be adopted by MN 910.

Optionally, in addition to the MRB configuration infor- mation, the S-NODE MODIFICATION REQUEST ACKNOWLEDGE message may include a further list of affected UEs. Each UE within the further list of affected UEs receives the same one service belonging to the MBS. The further list of affected UEs can be indicated by a list of UE ID (e.g., NG-RAN node UE XnAP ID), or an MBS service ID (e.g., TMGI). After receiving the S-NODE MODIFICA- TION REQUEST message including the MRB configura- tion and identifying the affected UEs, SN 920 can generate a RRC RECONFIGURATION message for each individual UE and sends to each UE via RRC signalling respectively. In case PTM MRB is configured to SN 920 with HARQ feedback (ACK&NACK or NACK only) enabled in SN 920, SN 920 can provide the corresponding PUCCH resources to the list of UEs that need to send HARQ feedback in the SCG UL.

Details described in all other embodiments of the present application (for example, details of a mechanism for trans- mitting MRB configuration information) are applicable for the embodiments of FIG. 9. Moreover, details described in the embodiments of FIG. 9 are applicable for all the embodi- ments of FIGS. 1-8 and 10-14.

FIG. 10 illustrates an exemplary flowchart of transmitting MRB configuration information during a SN initiated SN modification procedure in accordance with some embodi- ments of the present application.

As shown in FIG. 10, in operation 1001, to configure a SN terminated MCG bearer or a SN terminated split bearer or to or release a QoS flow back to a MN terminated bearer, SN 1020 (e.g., SN 103 as illustrated and shown in FIG. 1) transmits a S-NODE MODIFICATION REQUIRED mes- sage to MN 1010 (e.g., MN 102 as illustrated and shown in FIG. 1). The S-NODE MODIFICATION REQUIRED mes- sage includes the MRB configuration information which should be used at MN 1010. The MRB configuration infor- mation in the S-NODE MODIFICATION REQUIRED mes- sage may contain at least one of:

(1) Parameter(s) of RLC and MAC layers for a SN terminated MCG bearer, and these parameter(s) are suggested by SN 1020 to be adopted by MN 1010.

(2) Parameter(s) of RLC and MAC layers for a SN terminated split bearer, and these parameter(s) are suggested by SN 1020 to be adopted by MN 1010.

(3) Parameter(s) of SDAP, PDCP, RLC and MAC layers for a MN terminated radio bearer, and these parameter(s) are suggested by SN 1020 to be adopted by MN 1010.

Optionally, in addition to the MRB configuration information, the S-NODE MODIFICATION REQUIRED message may include a list of affected UEs. Each UE within the list of affected UEs receives one service belonging to the MBS. The list of affected UEs can be indicated by a list of UE ID (e.g., NG-RAN node UE XnAP ID), or an MBS service ID (e.g., TMGI). If an MBS service ID is provided, MN 1010 can identify the affected UEs from UE context about their subscribed or interested MBS services.

If MN 1010 accepts the required SN modification from SN 1020, MN 1010 may reply a S-NODE MODIFICATION CONFIRM message to SN 1020 in operation 1002. The S-NODE MODIFICATION CONFIRM message include MRB configuration information, if MN 1010 decides to further configure a SN terminated MCG bearer or a SN terminated split bearer using resource(s) from SN 1020. The MRB configuration information in the S-NODE MODIFICATION CONFIRM message may contain: parameter(s) of RLC and MAC layers for a MN terminated SCG bearer or MN terminated split bearer that are suggested by MN 1010 to be adopted by SN 1020.

Optionally, in addition to the MRB configuration information, the S-NODE MODIFICATION CONFIRM message may include a further list of affected UEs. Each UE within the further list of affected UEs receives the same one service belonging to the MBS. The further list of affected UEs can be indicated by a list of UE ID (e.g., NG-RAN node UE XnAP ID), or an MBS service ID (e.g., TMGI). After receiving the S-NODE MODIFICATION REQUEST message including the MRB configuration and identifying the affected UEs, MN 1010 can generate a RRC RECONFIGURATION message for each individual UE and sends to each UE via RRC signalling respectively. In case PTM MRB is configured to MN 1010 with HARQ feedback (ACK&NACK or NACK only) enabled in MN 1010, MN 1010 can provide the corresponding PUCCH resources to the list of UEs that need to send HARQ feedback in the MCG UL.

Details described in all other embodiments of the present application (for example, details of a mechanism for transmitting MRB configuration information) are applicable for the embodiments of FIG. 10. Moreover, details described in the embodiments of FIG. 10 are applicable for all the embodiments of FIGS. 1-9 and 11-14.

FIG. 11 illustrates an exemplary flowchart of transmitting MRB configuration information during a SN addition procedure in accordance with some embodiments of the present application.

As shown in FIG. 11, in operation 1101, to configure a MN terminated SCG bearer or a MN terminated split bearer or to offload a QoS flow to a SN terminated bearer, MN 1110 (e.g., MN 102 as illustrated and shown in FIG. 1) transmits a S-NODE ADDITION REQUEST message to SN 1120 (e.g., SN 103 as illustrated and shown in FIG. 1). The S-NODE ADDITION REQUEST message includes the MRB configuration information which should be used at SN 1120. The MRB configuration information in the S-NODE ADDITION REQUEST message may contain at least one of:

(1) Parameter(s) of RLC and MAC layers for a MN terminated SCG bearer, and these parameter(s) are suggested by MN 1110 to be adopted by SN 1120.

(2) Parameter(s) of RLC and MAC layers for a MN terminated split bearer, and these parameter(s) are suggested by MN 1110 to be adopted by SN 1120.

(3) Parameter(s) of SDAP, PDCP, RLC and MAC layers for a SN terminated radio bearer, and these parameter(s) are suggested by MN 1110 to be adopted by SN 1120.

Optionally, in addition to the MRB configuration information, the S-NODE ADDITION REQUEST message may include a list of affected UEs. Each UE within the list of affected UEs receives one service belonging to the MBS. The list of affected UEs can be indicated by a list of UE ID (e.g., NG-RAN node UE XnAP ID), or an MBS service ID (e.g., TMGI). If an MBS service ID is provided, SN 1120 can identify the affected UEs from UE context about their subscribed or interested MBS services.

If SN 1120 accepts the SN addition request from MN 1110, SN 1120 may reply a S-NODE ADDITION REQUEST ACKNOWLEDGE message in operation 1102. The S-NODE ADDITION REQUEST ACKNOWLEDGE message include MRB configuration information, if SN 1120 decides to configure a SN terminated MCG bearer or a SN terminated split bearer using resource(s) from MN 1110. The MRB configuration information in the S-NODE ADDITION REQUEST ACKNOWLEDGE message may contain parameter(s) of RLC and MAC layers for a SN terminated MCG bearer or a SN terminated split bearer, and these parameter(s) are suggested by SN 1120 to be adopted by MN 1110.

Optionally, in addition to the MRB configuration information, the S-NODE ADDITION REQUEST ACKNOWLEDGE message may include a further list of affected UEs. Each UE within the further list of affected UEs receives the same one service belonging to the MBS. The further list of affected UEs can be indicated by a list of UE ID (e.g., NG-RAN node UE XnAP ID), or an MBS service ID (e.g., TMGI). After receiving the S-NODE MODIFICATION REQUEST message including the MRB configuration and identifying the affected UEs, SN 1120 can generate a RRC RECONFIGURATION message for each individual UE and sends to each UE via RRC signalling respectively. In case PTM MRB is configured to SN 1120 with HARQ feedback (ACK&NACK or NACK only) enabled in SN 1120, SN 1120 can provide the corresponding PUCCH resources to the list of UEs that need to send HARQ feedback in the SCG UL.

Details described in all other embodiments of the present application (for example, details of a mechanism for transmitting MRB configuration information) are applicable for the embodiments of FIG. 11. Moreover, details described in the embodiments of FIG. 11 are applicable for all the embodiments of FIGS. 1-10 and 12-14.

FIG. 12 illustrates an exemplary flowchart of a method for receiving capability information associated with a MBS in accordance with some embodiments of the present application.

The exemplary method 1200 in the embodiments of FIG. 12 may be performed by: a UE (e.g., UE 101 as shown and illustrated in FIG. 1 or UE 20 as shown and illustrated in FIG. 13). Although described with respect to a UE, it should be understood that other devices may be configured to perform a method similar to that of FIG. 12.

In the exemplary method 1200 as shown in FIG. 12, in operation 1201, a UE (e.g., UE 101 as shown and illustrated in FIG. 1) receives conditional configuration for a CPAC procedure. In operation 1202, the UE receives capability information regarding each candidate cell of the UE or each candidate SN of the UE. The capability information is associated with a MBS and may also be named as MBS capability information or the like. In operation 1203, the UE starts the CPAC procedure.

According to some embodiments, the capability information received in operation 1202 and the conditional configuration information for the CPAC procedure received in operation 1201 are included in the same RRC message.

According to some embodiments, the MBS capability information received in operation 1202 indicates at least one of:

(1) Whether a candidate cell of the UE or a candidate SN of the UE supports a service belonging to the MBS. The service belonging to the MBS may be a multicast service or a broadcast service.

(2) What service belonging to the MBS is supported by the candidate cell or the candidate SN, if the candidate cell or the candidate SN supports the service belonging to the MBS.

(3) Whether the candidate cell or the candidate SN supports a point to multipoint (PTM) transmission.

(4) Whether the candidate cell or the candidate SN supports a hybrid automatic repeat request (HARQ) feedback operation, if the candidate cell or the candidate SN supports the PTM transmission.

(5) Whether the candidate cell or the candidate SN supports a multicast session in a radio resource control (RRC) connected state.

(6) Whether the neighbor node supports a broadcast session in the RRC connected state.

(7) Whether the neighbor node supports a multicast session in at least one of a RRC inactive state and a RRC idle state.

(8) Whether the neighbor node supports a broadcast session in the at least one of the RRC inactive state and the RRC idle state.

(9) Whether the candidate cell or the candidate SN supports a multicast session associated with the MBS.

(10) Whether the candidate cell or the candidate SN supports a broadcast session associated with the MBS.

According to some embodiments, the conditional configuration information for the CPAC procedure received in operation 1201 includes at least one of: an execution condition for the CPAC procedure; and RRC reconfiguration information for each candidate cell or each candidate SN. In an embodiment, the UE further evaluate, based on a measurement of the UE, whether a candidate cell of the UE or a candidate SN of the UE meets the execution condition for the CPAC procedure.

In an example, if one candidate cell of the UE meets the execution condition the CPAC procedure and if this candidate cell supports a service (which belongs to the MBS) of an interest of the UE, the UE may connect to this candidate cell. If one candidate SN of the UE meets the execution condition the CPAC procedure and if this candidate SN supports a service (which belongs to the MBS) of an interest of the UE, the UE may connect to this candidate SN.

In a further example, if two or more candidate cells of the UE meet the execution condition the CPAC procedure, the UE may prioritize these two or more candidate cells, select a candidate cell with a highest priority from the prioritized two or more candidate cells, and connect to the selected candidate cell. For instance, during the UE prioritizing these two or more candidate SNs (which meet the execution condition for the CPAC procedure), if one or more cells belonging to these two or more candidate cells support a service (which belongs to the MBS) of an interest of the UE, the UE may set one or more higher priorities to such one or more cells which support the service of the interest of the UE, compared with a cell belonging to these two or more candidate cells which does not support the service of the interest of the UE. That is, for cell(s) belonging to these two or more candidate cells, the UE may set a higher priority to a cell which supports the service of the interest of the UE, and set a lower priority to a cell which does not support the service of the interest of the UE.

In another example, if two or more candidate SNs of the UE meet the execution condition, the UE may prioritize these two or more candidate SNs, select a candidate SN with a highest priority from the prioritized two or more candidate SNs, and connect to the selected candidate SN. For instance, during the UE prioritizing these two or more candidate SNs (which meet the execution condition for the CPAC procedure), if one or more SNs belonging to these two or more candidate SNs support a service (which belongs to the MBS) of an interest of the UE, the UE may set one or more higher priorities to such one or more SNs which support the service of the interest of the UE, compared with a SN belonging to these two or more candidate SNs which does not support the service of the interest of the UE. That is, for SN(s) belonging to these two or more candidate SNs, the UE may set a higher priority to a SN which supports the service of the interest of the UE, and set a lower priority to a SN which does not support the service of the interest of the UE.

Details described in all other embodiments of the present application (for example, details of a SCG activation mechanism in a MR-DC scenario) are applicable for the embodiments of FIG. 12. Moreover, details described in the embodiments of FIG. 12 are applicable for all the embodiments of FIGS. 1-11, 13, and 14.

FIG. 13 illustrates an exemplary flowchart of MRB configuration transmission in a conditional PSCell addition and change (CPAC) procedure in accordance with some embodiments of the present application.

As shown in FIG. 13, in operation 1301, RAN node 10 (e.g., any one of MN 102, SN 103, MN 610, SN 620, RAN node 1, RAN node 2, RAN node 20, MN 910, SN 920, MN 1010, SN 1020, MN 1110, SN 1120 as illustrated and shown in FIGS. 1 and 6-11) transmits MBS capability information for each candidate cell or each candidate SN to UE 20 (e.g., UE 101 as shown and illustrated in FIG. 1).

According to some embodiments, in a CPAC procedure, a MN (e.g., MN 102 as illustrated and shown in FIG. 1) or a SN (e.g., SN 103 as illustrated and shown in FIG. 1) provides, to UE 20, MBS capability information for each candidate cell or each candidate SN of UE 20. Such MBS capability information could be conveyed in the same RRC message which provides conditional configuration (e.g., including the execution condition for the CPAC procedure and corresponding RRCReconfiguration for each candidate cell or each candidate SN) for the CPAC procedure. For example, when sending the RRC message to configure CPAC at UE 20, in the same RRC message, the MN also informs UE 20 with MBS capability of the candidate cells or the candidate SN.

In an embodiment, after UE 20 receives the conditional configuration for a CPAC procedure and starting the CPAC procedure, UE 20 determines and selects a candidate cell or a candidate SN to connect to while taking into account both the execution condition for the CPAC procedure and the MBS capability information. For example, UE 20 may evaluate whether any of the candidate cells or candidate SNs meets the execution condition for the CPAC procedure based on a measurement result of UE 20 (e.g., the measured link quality is better than a threshold).

For instance, if one candidate cell of UE 20 meets the execution condition for the CPAC procedure and if this candidate cell supports a service (which belongs to the MBS) of an interest of UE 20, UE 20 may connect to this candidate cell. If one candidate SN of UE 20 meets the execution condition the CPAC procedure and if this candidate SN supports a service (which belongs to the MBS) of an interest of UE 20, UE 20 may connect to this candidate SN.

For instance, if there are two or more candidate cells or candidate SNs meet the execution condition for the CPAC procedure, UE 20 may prioritize these two or more candidate cells or candidate SNs that can provide the MBS service of an interest of UE 20. Then, UE 20 may select a candidate cell with a highest priority from the prioritized candidate cells or select a candidate SN with a highest priority from the prioritized SNs, and then connect to the selected candidate cell or the selected candidate SN.

In an example, during UE 20 prioritizing two or more candidate cells (which meet the execution condition for the CPAC procedure), if one or more cells belonging to these two or more candidate cells support a service (which belongs to the MBS) of an interest of UE 20, UE 20 may set one or more higher priorities to such one or more cells which support the service of the interest of UE 20, compared with a cell belonging to these two or more candidate cells which does not support the service of the interest of UE 20. That is, for cell(s) belonging to these two or more candidate cells, UE 20 may set a higher priority to a cell which supports the service of the interest of UE 20, and set a lower priority to a cell which does not support the service of the interest of UE 20.

In a further example, during UE 20 prioritizing two or more candidate SNs (which meet the execution condition for the CPAC procedure), if one or more SNs belonging to these two or more candidate SNs support the service (which belongs to the MBS) of the interest of the UE, the UE may set one or more higher priorities to such one or more SNs which support the service of the interest of the UE, compared with a SN belonging to these two or more candidate SNs which does not support the service of the interest of the UE. That is, for SN(s) belonging to these two or more candidate SNs, the UE may set a higher priority to a SN which supports the service of the interest of the UE, and set a lower priority to a SN which does not support the service of the interest of the UE.

Details described in all other embodiments of the present application (for example, details of receiving capability information associated with a MBS) are applicable for the embodiments of FIG. 13. Moreover, details described in the embodiments of FIG. 13 are applicable for all the embodiments of FIGS. 1-12 and 14.

FIG. 14 illustrates an exemplary block diagram of an apparatus according to some embodiments of the present application. In some embodiments of the present application, the apparatus 1400 may be a RAN node (e.g., a MN or a SN) or a UE, which can at least perform the method illustrated in any of FIGS. 5-13.

As shown in FIG. 14, the apparatus 1400 may include at least one receiver 1402, at least one transmitter 1404, at least one non-transitory computer-readable medium 1406, and at least one processor 1408 coupled to the at least one receiver 1402, the at least one transmitter 1404, and the at least one non-transitory computer-readable medium 1406.

Although in FIG. 14, elements such as the at least one receiver 1402, the at least one transmitter 1404, the at least one non-transitory computer-readable medium 1406, and the at least one processor 1408 are described in the singular, the plural is contemplated unless limitation to the singular is explicitly stated. In some embodiments of the present application, the at least one receiver 1402 and the at least one transmitter 1404 are combined into a single device, such as a transceiver. In certain embodiments of the present application, the apparatus 1400 may further include an input device, a memory, and/or other components.

In some embodiments of the present application, the at least one non-transitory computer-readable medium 1406 may have stored thereon computer-executable instructions which are programmed to implement the operations of the methods, for example as described in view of any of FIGS. 5-13, with the at least one receiver 1402, the at least one transmitter 1404, and the at least one processor 1408.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a first radio access network (RAN) node, comprising:

obtaining capability information regarding one or more neighbor nodes in a RAN, the capability information regarding the one or more neighbor nodes being associated with a multicast broadcast service (MBS);

determining, based on the capability information regarding the one or more neighbor nodes, first configuration information regarding a multicast radio bearer (MRB);

transmitting, to a second RAN node in a multi-radio dual connectivity (MR-DC) scenario, the first configuration information regarding the MRB, the second RAN node belonging to the one or more neighbor nodes; and receiving, from the second RAN node, second configuration information regarding the MRB, wherein each of the first configuration information regarding the MRB and the second configuration information regarding the MRB includes at least one of:

an indicator regarding a service;

a bearer type;

packet data convergence protocol (PDCP) layer configuration information;

radio link control (RLC) layer configuration information; and configuration information regarding a hybrid automatic repeat request (HARQ) feedback operation for a point to multipoint (PTM) MRB.

2. The method of claim 1, wherein the capability information regarding the one or more neighbor nodes indicates at least one of:

whether a neighbor node within the one or more neighbor nodes supports a service belonging to the MBS;

what service belonging to the MBS is supported by the neighbor node, in response to the neighbor node supporting the service belonging to the MBS;

whether the neighbor node supports a point to multipoint (PTM) transmission;

whether the neighbor node supports a hybrid automatic repeat request (HARQ) feedback operation, in response to the neighbor node supporting the PTM transmission;

whether the neighbor node supports a multicast session in a radio resource control (RRC) connected state;

whether the neighbor node supports a broadcast session in the RRC connected state;

whether the neighbor node supports a multicast session in at least one of a RRC inactive state and a RRC idle state;

whether the neighbor node supports a broadcast session in the at least one of the RRC inactive state and the RRC idle state;

whether the neighbor node supports a multicast session associated with the MBS; and whether the neighbor node supports a broadcast session associated with the MBS.

3. The method of claim 1, wherein the indicator regarding the service is one of: an indicator implying that the service belongs to the MBS; an indicator implying that the service does not belong to the MBS; and a temporary mobile group identity (TMGI).

4. The method of claim 1, further comprising:

transmitting, to the second RAN node, first information regarding a first group of associated user equipment (UEs), wherein each UE within the first group of associated UEs receives one service belonging to the MBS.

5. The method of claim 4, further comprising:

receiving, from the second RAN node, second information regarding a second group of associated user equipment (UEs), wherein each UE within the second group of associated UEs receives one service belonging to the MBS.

6. The method of claim 5, wherein each of the first information regarding the first group of associated UEs and the second information regarding the second group of associated UEs includes at least one of:

a list of UE identifiers (IDs) of the first group of associated UEs or a list of UE IDs of the second group of associated UEs; and an ID of the one service belonging to the MBS, wherein the one service belonging to the MBS is received by the first group of associated UEs or the second group of associated UEs.

7. The method of claim 1, wherein the bearer type includes one of: a point-to-point (PTP) MRB; a point-to-multipoint (PTM) MRB; and a bearer including a PTP RLC leg and a PTM RLC leg.

8. A first radio access network (RAN) node, comprising:

at least one memory; and at least one processor coupled with the at least one memory and operable to cause the first RAN node to:

obtain capability information regarding one or more neighbor nodes in a RAN, the capability information regarding the one or more neighbor nodes being associated with a multicast broadcast service (MBS);

determine, based on the capability information regarding the one or more neighbor nodes, first configuration information regarding a multicast radio bearer (MRB);

transmit, to a second RAN node in a multi-radio dual connectivity (MR-DC) scenario, the first configuration information regarding the MRB, the second RAN node belonging to the one or more neighbor nodes; and receive, from the second RAN node, second configuration information regarding the MRB, wherein each of the first configuration information regarding the MRB and the second configuration information regarding the MRB includes at least one of:

an indicator regarding a service;

a bearer type;

packet data convergence protocol (PDCP) layer configuration information;

radio link control (RLC) layer configuration information; and configuration information regarding a hybrid automatic repeat request (HARQ) feedback operation for a point to multipoint (PTM) MRB.

9. The first RAN node of claim 8, wherein the capability information regarding the one or more neighbor nodes indicates at least one of:

whether a neighbor node within the one or more neighbor nodes supports a service belonging to the MBS;

what service belonging to the MBS is supported by the neighbor node, in response to the neighbor node supporting the service belonging to the MBS;

whether the neighbor node supports a point to multipoint (PTM) transmission;

whether the neighbor node supports a hybrid automatic repeat request (HARQ) feedback operation, in response to the neighbor node supporting the PTM transmission;

whether the neighbor node supports a multicast session in a radio resource control (RRC) connected state;

whether the neighbor node supports a broadcast session in the RRC connected state;

whether the neighbor node supports a multicast session in at least one of a RRC inactive state and a RRC idle state;

whether the neighbor node supports a broadcast session in the at least one of the RRC inactive state and the RRC idle state;

whether the neighbor node supports a multicast session associated with the MBS; and whether the neighbor node supports a broadcast session associated with the MBS.

10. The first RAN node of claim 8, wherein the indicator regarding the service is one of: an indicator implying that the service belongs to the MBS; an indicator implying that the service does not belong to the MBS; and a temporary mobile group identity (TMGI).

11. The first RAN node of claim 8, wherein the bearer type includes one of: a point-to-point (PTP) MRB; a PTM MRB; and a bearer including a PTP RLC leg and a PTM RLC leg.

12. The first RAN node of claim 8, wherein the at least one processor is further operable to cause the first RAN node to:

transmit, to the second RAN node, first information regarding a first group of associated user equipment (UEs), wherein each UE within the first group of associated UEs receives one service belonging to the MBS.

13. The first RAN node of claim 12, wherein the at least one processor is further operable to cause the first RAN node to:

receive, from the second RAN node, second information regarding a second group of associated user equipment (UEs), wherein each UE within the second group of associated UEs receives one service belonging to the MBS.

14. The first RAN node of claim 13, wherein each of the first information regarding the first group of associated UEs and the second information regarding the second group of associated UEs includes at least one of:

a list of UE identifiers (IDs) of the first group of associated UEs or a list of UE IDs of the second group of associated UEs; and an ID of the one service belonging to the MBS, wherein the one service belonging to the MBS is received by the first group of associated UEs or the second group of associated UEs.

15. A second radio access network (RAN) node, comprising:

at least one memory; and at least one processor coupled with the at least one memory and operable to cause the second RAN node to:

determine first configuration information regarding a multicast radio bearer (MRB);

transmit the first configuration information to a first RAN node in a multi-radio dual connectivity (MR-DC) scenario, wherein the first configuration information is associated with a multicast broadcast service (MBS); and receive, from the first RAN node, second configuration information regarding the MRB, wherein each of the first configuration information regarding the MRB and the second configuration information regarding the MRB includes at least one of:

an indicator regarding a service;

a bearer type;

packet data convergence protocol (PDCP) layer configuration information;

radio link control (RLC) layer configuration information; and configuration information regarding a hybrid automatic repeat request (HARQ) feedback operation for a point to multipoint (PTM) MRB.

16. The second RAN node of claim 15, wherein the indicator regarding the service is one of: an indicator implying that the service belongs to the MBS; an indicator implying that the service does not belong to the MBS; and a temporary mobile group identity (TMGI).

17. The second RAN node of claim 15, wherein the bearer type includes one of: a point-to-point (PTP) MRB; a point-to-multipoint (PTM) MRB; and a bearer including a PTP RLC leg and a PTM RLC leg.

18. The second RAN node of claim 15, wherein the at least one processor is further operable to cause the second RAN node to:

transmit, to the first RAN node, information regarding a group of associated user equipment (UEs), wherein each UE within the group of associated UEs receives one service belonging to the MBS.

19. A method performed by a second radio access network (RAN) node, comprising:

determining first configuration information regarding a multicast radio bearer (MRB);

transmitting, to a first RAN node in a multi-radio dual connectivity (MR-DC) scenario, the first configuration information regarding the MRB, wherein the first configuration information is associated with a multicast broadcast service (MBS); and receiving, from the first RAN node, second configuration information regarding the MRB, wherein each of the first configuration information regarding the MRB and the second configuration information regarding the MRB includes at least one of:

an indicator regarding a service;

a bearer type;

packet data convergence protocol (PDCP) layer configuration information;

radio link control (RLC) layer configuration information; and configuration information regarding a hybrid automatic repeat request (HARQ) feedback operation for a point to multipoint (PTM) MRB.

20. The method of claim 19, wherein the bearer type includes one of: a point-to-point (PTP) MRB; a point-to-multipoint (PTM) MRB; and a bearer including a PTP RLC leg and a PTM RLC leg.

\* \* \* \* \*